B. F. STANNARD & A. AGINSKEE.
AUTOMOBILE FENDER.
APPLICATION FILED SEPT. 21, 1910.
1,023,971.
Patented Apr. 23, 1912.
3 SHEETS—SHEET 1.
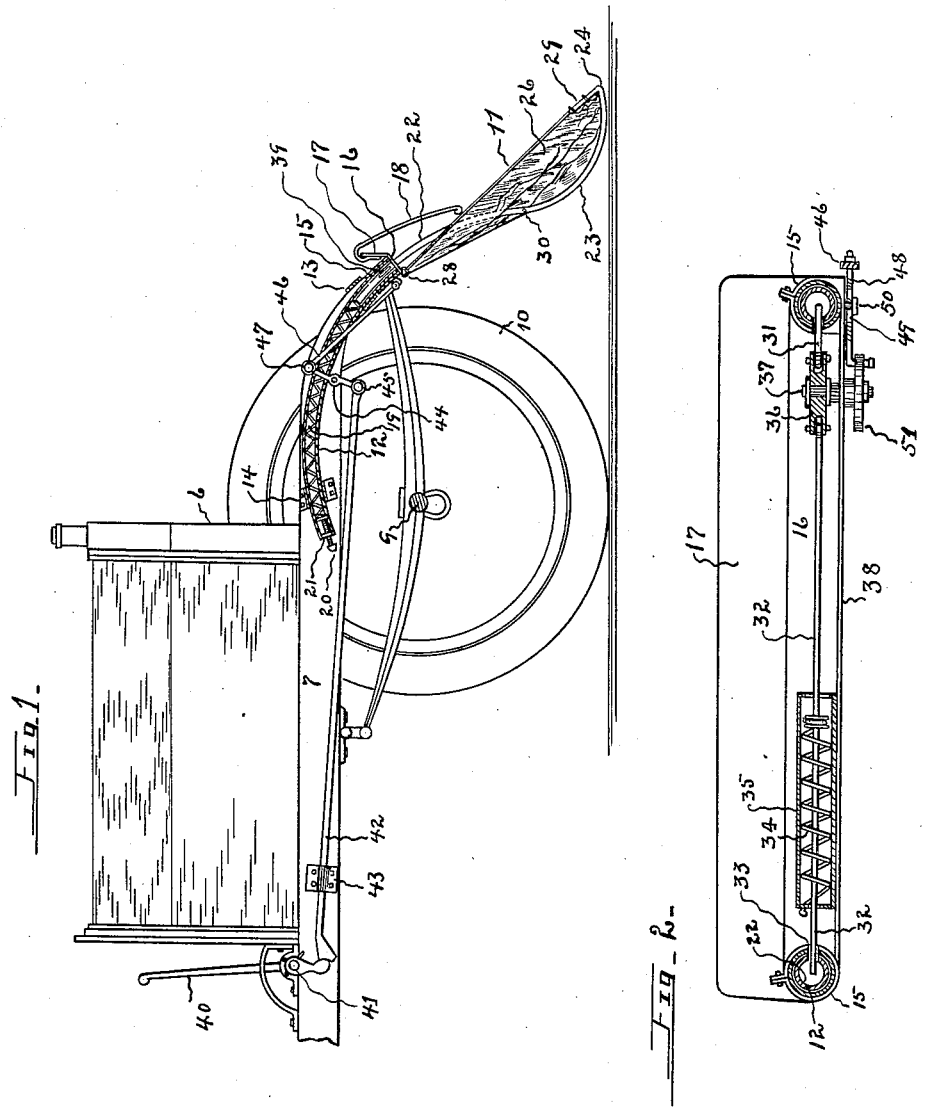

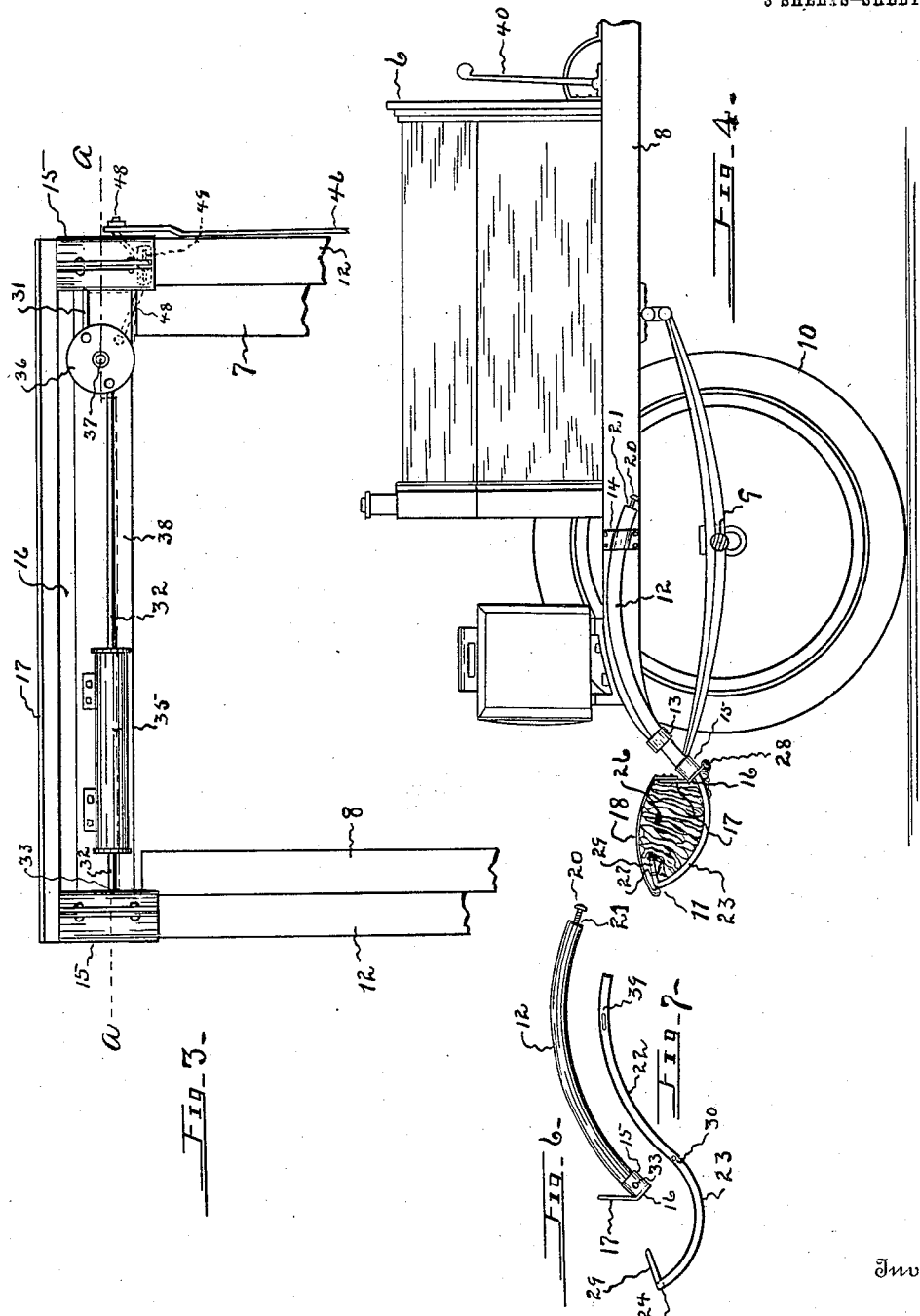

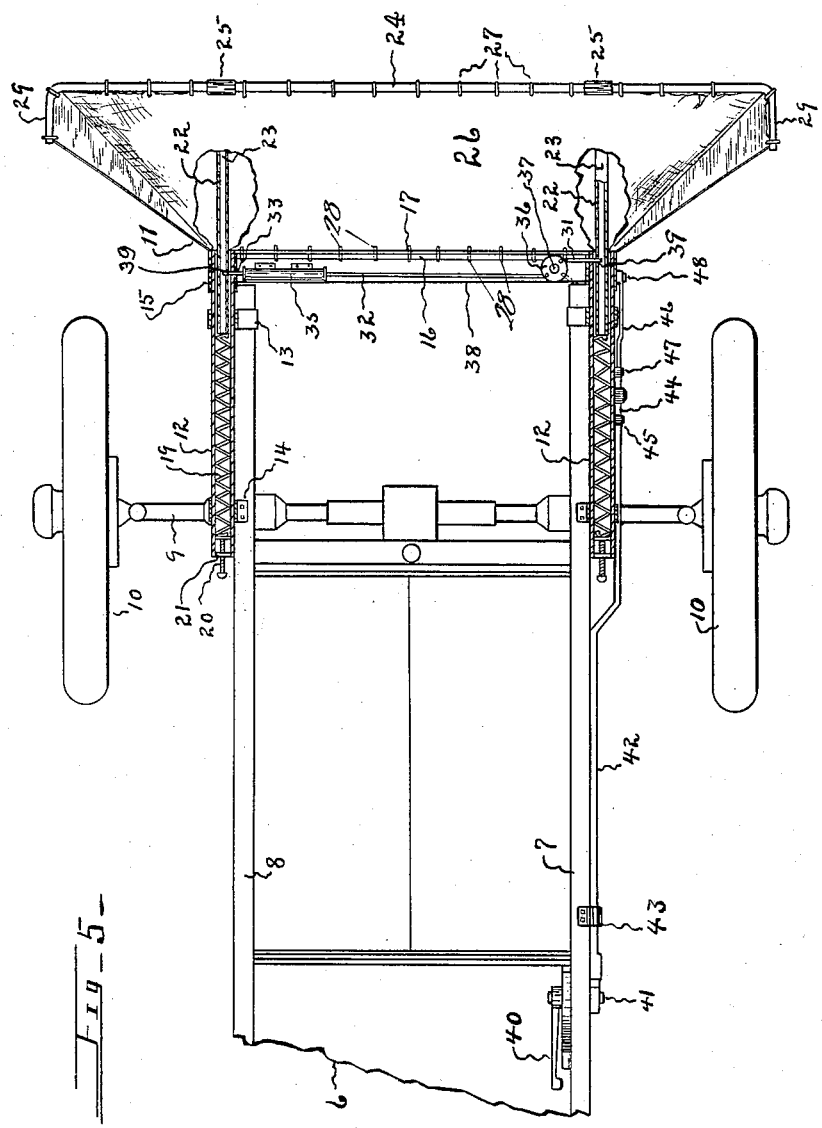

UNITED STATES PATENT OFFICE.

BENJAMIN F. STANNARD AND ABRAHAM AGINSKEE, OF OMAHA, NEBRASKA, ASSIGNORS TO NATIONAL AUTOMATIC VEHICLE FENDER COMPANY, OF OMAHA, NEBRASKA, A CORPORATION.

AUTOMOBILE-FENDER.

1,023,971.  Specification of Letters Patent.  Patented Apr. 23, 1912.

Application filed September 21, 1910. Serial No. 583,065.

*To all whom it may concern:*

Be it known that we, BENJAMIN F. STANNARD and ABRAHAM AGINSKEE, citizens of the United States, residing at Omaha, in the county of Douglas and State of Nebraska, have invented certain new and useful Improvements in Automobile-Fenders, of which the following is a specification.

This invention relates to improvements in fenders for automobiles or other like vehicles, and has for its object to provide a fender consisting of few and simple parts, so that it may be economically constructed and may be conveniently mounted upon the vehicle.

The invention includes the use of curved fender arms mounted upon the sides of the vehicle frame, said arms being provided at their front ends with a resiliently supported fender, and slidable longitudinally of the car for the purpose of elevating or lowering the same and for folding or unfolding the apron or flexible portion of the fender.

The invention also includes a resilient means for moving the fender arms in one direction, and convenient means within the control of the driver of the car for operating the fender.

With these objects in view, the invention presents a novel construction, combination and arrangement of parts as described herein and illustrated in the drawing, it being understood that changes in form, size, proportion and minor details may be made within the scope of the claims without departing from the spirit of the invention.

In the accompanying drawing, Figure 1 is a vertical side view showing the front part of an automobile, with the fender in a lowered position, a housing-tube being in section and one of the wheels removed. Fig. 2 is a vertical sectional view on the irregular line *a—a* of Fig. 3, the housing box for the spring and upper disk being in section and the lower disk and slotted rock-lever also being shown. Fig. 3 is a broken-away plan view showing the front end of the housing tubes and devices mounted thereon. Fig. 4 shows the front part of an automobile, being a view of the reverse side to that shown in Fig. 1, and showing the fender arms when elevated. Fig. 5 is a plan view of the same parts shown in Fig. 1 with the housing tubes in section, the canvas web or apron of the fender being partly broken away and the hood omitted. Figs. 6 and 7 are detailed views relating to Fig. 1, showing the inner side, respectively, of a curved housing-tube and a fender-arm.

Referring now to the drawing for a more particular description, the numeral 6 indicates an automobile, the respective side plates of the frame thereof being indicated at 7 and 8. The front axle and wheels are indicated, respectively, at 9 and 10.

The fender is indicated at 11, the same being provided with curved housing tubes 12, which extend forwardly of the side plates and may be secured thereto by any suitable means, the means herein shown being clips 13 and brackets 14.

At 15 are indicated clips mounted upon the front terminals of the housing tubes and at 16 is shown a transverse supporting-plate rigidly mounted upon clips 15, the supporting-plate being supplied with an upright dash 17 for mounting thereon hood 18.

Within housing tubes 12 are coiled springs 19 and at 20 are indicated thumb screws having a threaded connection with the terminal fillers 21 of the housing tubes, whereby an adjustment may be made to regulate the tension of springs 19.

At 22 are indicated curved fender arms, the degree of curvature thereof corresponding with the curvature of housing tubes 12, said fender arms having end portions 23 curved reversely to that of arms 22.

At 24 is indicated a buffer-bar disposed transversely of the car, its end 29 being turned upwardly. The buffer-bar is mounted upon the end portions of arms 22 by any suitable means, the means herein shown being clips 25. Fender arms 22 are adapted to have a seating within housing tubes 12, their rear ends having bearings upon the front terminals of springs 19. Bar 24 extends laterally of the car a sufficient distance to be disposed at the front of the wheels, and at 26 is indicated a flexible member or apron, preferably constructed of canvas. The apron is connected with the buffer-bar preferably by numerous rings 27 and is also supported by rings 28 mounted upon the lower edge of transverse supporting-plate 16.

It will be understood that arms 22 are slidable in the housing tubes 12 and they may be moved in unison forwardly and longitudinally of the car by the actuation of springs 19, at which time the apron 26 will be extended. Arms 22 may be elevated or moved inwardly of the housing tubes, at which time springs 19 will be compressed, and the apron 26 will be folded, and when folded will occupy a position adjacent to supporting plate 16, the hood 18 overhanging the apron at this time for the protection of the same from the weather or dust. The terminal of the buffer-bar 24 is provided with transverse portions 29, this construction contributing to the holding capacity of the apron.

In order that arms 22 may be held within housing tubes 12 and may resist the pressure of springs 19 when they are elevated or moved inwardly of said tubes, certain devices are employed and will now be explained. Apertures or slots 30 are formed in arms 22 near their reversely-curved end-portions 23, and detent-bars or engaging-pins indicated respectively at 31 and 32 are employed, the same being adapted to pass through apertures 33 formed in clips 15, housing tubes 12, and apertures 30 of arms 22 at a time when said arms have been elevated or moved inwardly of the housing tubes, for detaining or holding arms 22 within said tubes 12.

Pin 32 extends transversely of the vehicle and extends from the arm 22 on the left hand side of the vehicle which it engages, to the disk 36 to operate as a pull-rod. At 34 is indicated a spiral spring mounted within the stationary cylinder 35, whereby pin or pull rod 32 is normally detained within the slot 30 of one of the arms 22 after the arms 22 have been elevated. At 36 is indicated a disk supported upon a stud or pivot-post 37, said stud being mounted upon the platform 38, this platform being horizontally disposed and rigidly secured to clips 15.

By reference to Fig. 2 it will be seen that the pins 31 and 32 are mounted upon the disk 36 and when this disk is partly rotated in one direction by actuation of the spring 34, pins 31 and 32 will move in a direction to pass within the apertures of the arms 22, and when the disk 36 is caused to rotate in a reverse direction, the pins 31 and 32 will be withdrawn from said apertures. Arms 22, near their rear ends, are provided with the elongated apertures or slots 39 adapted to be engaged by the pins 31 and 32 at a time when said arms have been extended forwardly from housing tubes 12.

At 40 is indicated a hand lever, the same being pivotally mounted at 41 upon the car frame. At 42 is indicated a push bar supported upon the frame by a bracket 43. At 44 is indicated a rock lever pivotally mounted upon the car frame, the push bar 42 having a mounting indicated at 45 upon said lever. At 46 is indicated a pull rod having a mounting indicated at 47 upon the rock bar 44 for one of its ends, its front end being mounted upon the rock lever 48 (Fig. 2) and formed with a slot 49. By means of the pivot 50 engaging within this slot, the rock lever 48 may be mounted near its middle upon one of the clips 15, its outer end being mounted upon the front end of the pull rod 46, its inner end being mounted upon the lower disk 51, said disk being disposed below the platform 38 upon the lower end of the stud 37.

As thus described, a release and consequent movement of the arms 22 forwardly from the housing tubes 12 may be made by the driver of the car. A movement of the lever 40 will cause a forward movement of the push bar 42, thereby causing a rearward movement of the pull-rod 46, the same causing actuation of the disk 36 in a manner to move pins 31 and 32 from engagement with the arms 22. At the time of this operation, it will be understood that the arms 22 have been elevated or passed inwardly of the housing tubes 12, causing the springs 19 to be compressed, and when the pins 31 and 32 by operation of the lever 40, have been withdrawn from their seatings within apertures 30, the springs 19 will be released and will cause the arms 22 to be projected forwardly of the car, the buffer-bar 24 and the connecting parts moving downwardly to the ground and forwardly of the car. Arms 22 will not be completely withdrawn from the tubes 12 at this time since the pins 31 and 32 will engage within the elongated apertures or slots 39 of said arms.

After the fender has been projected forwardly as last described, it may be moved manually in a rearward direction, arms 22 passing inwardly of the housing tubes 12 and said arms will be detained within the housing tubes by means of the pins 31 and 32 engaging within the slots 30 of the fender arms. It being understood, of course, that at the time of manually moving the arms 22 within the housing tubes 12, the bar 42 must first be moved forwardly so that the pins 31 and 32 will be removed from their engagement within the slots 39 of the fender arms.

The fender thus described may be economically constructed since it comprises few and simple parts and it may be conveniently mounted upon automobiles or other like vehicles generally.

It will be noted that the movement of arms 22 and the flexible apron attached thereto is in a direction inclinedly and downwardly, this being an advantage as compared with fenders which move or swing pivotally and it will be seen that the fender occupies a space, laterally considered, the entire width of the car. Tubes 12 and arms 22 may have any desired degree of curvature, so that the functions mentioned herein, may be discharged.

Having fully described our invention, what we claim and desire to secure by Letters Patent is,—

1. A fender of the class described comprising a pair of parallel, adjacently disposed, longitudinally-curved guides, a transverse supporting-plate mounted upon one of the terminals of said guides and provided with an upright dash; a pair of fender arms provided at one of their ends with a transverse buffer-bar, their opposite ends being seated in said guides; an apron of flexible material mounted upon and extending between the buffer-bar and said supporting plate; said fender-arms being adapted to have a slidable movement inwardly of said guides to fold and dispose said apron adjacent to said dash; and a hood adapted to overhang said apron.

2. A fender for automobiles comprising, in combination with the frame thereof, a pair of parallel, curved housing-tubes mounted upon the frame and having a transverse supporting plate connecting one of their terminals, spiral springs having means for adjustment and mounted in their opposite terminals; curved fender arms seated in said housing tubes, one of their terminals bearing upon said springs, their opposite ends being provided with a transversely-supported flexible apron, said springs being adapted to be compressed, the fender arms moving inwardly of the housing-tubes; and means for releasing the springs, the fender arms thereby moving outwardly of said housing tubes.

3. The combination with a vehicle frame, of a folding fender comprising curved guides disposed longitudinally of and rigidly mounted upon the frame; curved, apertured fender-arms provided with a transverse buffer-bar and having end-portions mounted in said guides; means supported by the guides adapted to normally move the fender-arms forwardly of said guides; detent-bars supported by the frame and adapted to engage within the apertures of the fender-arms; a flexible apron interposed between the buffer-bar and said frame and attached thereto; a hand lever upon the vehicle frame; levers attached to said detent-bars and having pivotal connections with each other and with the hand lever so that a movement of said hand lever will cause the detent-bars to move outwardly from the apertures of the fender-arms.

4. The combination with a vehicle frame of a folding fender comprising curved, apertured housing-tubes disposed longitudinally of and secured to the frame; spiral springs mounted within said tubes; curved, apertured fender-arms provided with a transverse buffer-bar and having curved end-portions disposed within the tubes in engagement with said springs; detent-bars resiliently actuated to normally engage within the apertures of the housing tubes and fender-arms; a flexible apron interposed between the buffer-bar and said frame and attached thereto; and means for removing said detent-bars from the apertures of the fender-arms.

In testimony whereof we have affixed our signatures in presence of two witnesses.

BENJAMIN F. STANNARD.
ABRAHAM AGINSKEE.

Witnesses:
HIRAM A. STURGES,
EDW. M. CLARK.

---

Copies of this patent may be obtained for five cents each, by addressing the "Commissioner of Patents, Washington, D. C."